United States Patent [19]

Driole et al.

[11] 4,049,437
[45] Sept. 20, 1977

[54] PROCESS OF SEPARATION, PARTICULARLY OF A SOLID PHASE, FROM A MATRIX IN LIQUID PHASE

[75] Inventors: Jean Driole; Colette Allibert; Etienne Bonnier, all of Grenoble; Alain Wicker, Limours, all of France

[73] Assignee: Agence Nationale de Valorisation de la Recherche, Neuilly-sur-Seine, France

[21] Appl. No.: 705,029

[22] Filed: July 14, 1976

[30] Foreign Application Priority Data

July 18, 1975 France .................................. 75.22556

[51] Int. Cl.² ............................ C22B 4/00; C22B 7/00
[52] U.S. Cl. ......................................... 75/10 R; 75/63
[58] Field of Search ...................................... 75/10-12, 75/63, 65

[56] References Cited

U.S. PATENT DOCUMENTS 3,672,872  6/1972  Bonnier ..................................... 75/63

Primary Examiner—Peter D. Rosenberg
Attorney, Agent, or Firm—Dennison, Dennison, Meserole & Pollack

[57] ABSTRACT

Process of production of a separate phase, especially a solid phase of modified composition, from a matrix in liquid phase.

Starting at a temperature at which the matrix is entirely molten, it is subjected to the action of an electromagnetic field, with such a frequency that the induced currents can be developed in the entire mass, and then the matrix is cooled, while maintaining the electromagnetic field, to a temperature range which causes the separation of a separate phase, especially a solid phase, and this phase is collected, under the effect of the electromagnetic field, in a certain zone of the matrix in the form of a compact mass.

9 Claims, No Drawings

PROCESS OF SEPARATION, PARTICULARLY OF A SOLID PHASE, FROM A MATRIX IN LIQUID PHASE

The invention relates to a process for the separation of a solid phase from a liquid phase matrix, particularly a solid phase of the type which can be formed below a given temperature and within this matrix. This process is of the type similar to those in which use is made of the differentiated effects on the different phases which can be exerted by magnetic fields, and wherein at least one phase is liquid, and the phases can coexist in thermodynamic equilibrium, in these two separate states, in certain temperature ranges.

In the application for the parent French Pat. No. 2,050,519 corresponding to U.S. Pat. No. 3,672,872, a separation process has already been described for separation of a solid phase from such a liquid matrix, at a generally rather high temperature. This process comprises subjecting the composite mixture to the action of a magnetic field of which the frequency is such that the induced currents can be developed in the entire mass.

In a first application for certificate of addition to the above patent, filed May 15, 1970, No. 70 17835, the application of this same process to the separation of two separate liquid phases was described.

This process utilizes, in every case, the often different behaviors of the separate phases of the composite mixture with respect to the electromagnetic forces which develop in this mixture, when the mixture is submitted to the action of a periodic magnetic field, especially an alternating field. It is then often observed that one of the phases, for example a solid phase, tends to collect at a certain zone in the matrix resulting in a true separation of the liquid phase and the solid phase.

This process is thus particularly useful when it is necessary to conduct these separations of separate phases at high temperatures, for example on the order of 2000° C, at which most of the known separation processes become difficult to carry out because of the poor mechanical and chemical behavior of the materials, or generally because of the technological difficulties which arise at such high temperatures.

The object of the present application constitutes an extension of the process, described in the principal patent and the first certificate of addition, to another technical field, in which it is also necessary to carry out separations of a separate phase, especially a solid phase, from a liquid matrix as defined above, at high temperatures. The field of application is that in which it is intended to gradually isolate the solid phase from the liquid, when the solid phase is formed within an initially homogeneous liquid matrix in the course of its cooling. It is known that the processes to obtain such separations customarily use liquation techniques, especially when they are to be applied to alloys.

For example, such liquation techniques have been applied to the extraction of solid silicon from a liquid alloy of aluminum and silicon having a much higher silicon content than the eutectic concentration, of which the silicon content is approximately 12.7%. The liquation technique consists of cooling such an Al-Si alloy very slowly from the liquid state. The best results are obtained with cooling rates of 10°-15° per hour. In this manner, a binary aluminum alloy containing for example 32% silicon and of which the melting point is approximately 850° C can be brought to approximately 900° C, can be stabilized at this temperature, then can be cooled at a cooling rate of approximately 13.5° C per hour, until it reaches 580° C (the eutectic temperature is on the order of 577° C.)

In these conditions, large dimension Si crystals are formed and grow regularly and gradually overrun the entire crucible. It is then suitable to cast the liquid by unplugging a casting hole or by tipping the crucible, in order to collect a relatively pure solid silicon which remains fastened to the inside of the crucible but which can be extracted relatively simply.

This process provides good separations. However, it takes very long to carry the process out, because of the necessity of working with extremely slow cooling rates. In fact, with faster cooling rates, the silicon crystals which are formed are much smaller, grow in an irregular fashion and confine the liquid aluminum much more. Separation by casting is then much less effective.

The object of this invention is to overcome these difficulties, especially to provide a process for separation of the separate phase, especially a solid phase during the process of its formation within a liquid matrix, during cooling of the liquid matrix, which is much quicker than, and also is as effective as, the liquation techniques, with regard to the effectiveness and the quality of the separation.

The process according to the invention is applicable to any homogenous liquid matrix at high temperature, formed of at least two separate constituents, and capable of giving rise to the formulation of at least one separate phase, especially a solid phase, when subjected to gradual cooling, wherein preferably starting at a temperature at which the liquid matrix is still entirely homogenous, it is subjected to the action of an electromagnetic field with frequency such that the induced currents can be developed in the entire mass of this matrix, and wherein, while the electromagnetic field is maintained, cooling is undertaken, either gradually or by stages, of the matrix in at least one part of the temperature range in which a liquid phase and a separate phase can coexist within this matrix. In the most advantageous case, the phase which is separated out of the originally entirely molten matrix during this cooling is a solid phase, which becomes localized in a certain zone or area in the matrix or along its periphery.

The application of the process according to the invention allows a much more rapid extraction rate of a separate phase, especially a solid phase, from a liquid matrix in the course of the cooling, than in the case of the liquation processes mentioned above. In fact, it is possible to realize these separations with much faster cooling rates. And under the action of an electromagnetic field, the separate phase which is separated from the liquid matrix tends to be deposited very compactly in a certain zone of the matrix, and this occurs even in the case where the densities of the separate phases which are formed are similar to the densities of the liquid matrix.

Thus, if the solid phases which are separated from the matrix are to be collected, the separation according to the invention is very effective because the retention in the solid separated from the liquid phase is greatly reduced, and as a result the solid is not greatly contaminated by the liquid.

If, on the contrary, the remaining liquid phase is to be collected, the separation according to the invention is also very effective, because then almost the entire liquid phase is recovered. Thus, the invention leads generally to a clearly improved separation over that of traditional liquation processes.

Of course, the cooling rate must not exceed that at which the separate phases, especially the solid phases which are separated from the liquid matrix, would tend to be deposited in the matrix in less compact and much more dispersed form because of the rate of their formation.

The process according to the invention can thus make it possible, especially if mixtures are used which form separate phases of very different compositions in at least a part of the above temperature range, to obtain an accumulation of materials in one part of the matrix where the materials have a modified composition as compared to the aggregate composition of the initial mixture. For example, the process according to the invention will make it possible to obtain enriched phases of at least one of the constituents of the initial mixture and consequently, the other phases in this same constituent will be weakened. This gives rise to the numerous applications to which the process according to the invention can be put: extraction from the enriched phases of a given metal from an alloy, purification of some phases by selective displacement of impurities in the other phase in the course of the gradual solidification of the mixture when submitted to the action of the electromagnetic field, etc.

The process according to the invention is applicable to all mixtures of constituents as defined above. Alloys are exemplary types of such mixtures, and when it concerns alloys giving rise to the formation of eutectics, the temperature range as it has been defined above is limited on the one hand by the temperature to which the first solid constituents appear, as originating from the entirely molten alloy, and on the other hand by the eutectic temperature. If the process is applied in a particularly effective manner to, for example, an aluminum-silicon alloy, the maximum temperature will naturally be dependent upon the initial constitution of the alloy. It will be specifically provided by the phase equilibrium diagram.

The treated material is held in a crucible or the like and submitted to the electromagnetic field which is necessary for the separation by means of an induction winding partially or entirely surrounding the crucible. Experience has also shown that, dependent upon the position of the crucible relative to the winding, the area of the matrix in which the solid constituents formed under the effect of the electromagnetic field collect will not always occupy the same position relative to the matrix as a whole.

The heating means can be constituted either by the induction winding and the accessory equipment or by other means, for example a furnace, cooperating with the induction winding.

The induction generator can be constituted in any known manner. In the examples to be described hereinafter, the induction winding was used both to the creation of a periodic electromagnetic field in the mass of the matrix and to the regulation of raising and lowering of temperature.

The winding or coil was associated with an induction generator comprising an asynchronous motor and a vertical-axis alternator powered by the motor, the alternator being arranged so as to feed the inductor by means of an oscillating circuit and a series of capacitors permitting the electrical balancing of the unit formed by the inductor winding and the material to be heated. The unit moreover comprises a magnetic amplifier suitable for control of the variations of voltage for excitation of the alternator, and consequently the electrical power furnished by the alternator. The magnetic amplifier was itself programmed with the aid of a potentiometer which was itself powered by a small electric motor. The electric power which was furnished was therefore directly correlated to the speed of operation of this small motor, so that the desired variations of temperature were controlled by corresponding variations of the velocity of rotation of this small motor.

An installation of this sort has been described in the thesis of Mme Collette ALLIBERT, at Grenoble in 1971 and entitled "Contribution à l'étude des équilibres de phases dans les systèms de métaux réfractaires" (Contribution to the Study of Phase Equilibriums in the Systems of Refractory Metals).

For the frequencies which are used, it suffices that they respond to the condition indicated above, in other words that they be capable of causing the production of induced currents which can be developed in the entire mass of the matrix. The frequencies will vary according to the dimensions and the volume of the treated sample. The method for determination of the suitable frequencies for use is known, for example by using the formula:

$$e = 5.10^{-3} \sqrt{p/f}$$

wherein:
  $e$ is the penetration depth of the currents induced in the treated mass, in cm.
  $p$ is the resistivity of the treated mass, in ohms/cm.
  $f$ is the periodic electromagnetic field frequency, especially alternating, in hertz.

For metallic materials, the general formula leads to frequencies customarily lower than 20,000 Hz.

Other important features of the invention will appear in the following description.

The materials identified in the examples have been treated either in small graphite crucibles with inner lining of aluminum or zircon, or 4 cm diameter and 7 – 8 cm height, or in larger crucibles of the same type, but having 10 and 15 cm diameters and a height of 20 cm.

For treatments effected in the small crucibles, 10,000 Hz induction furnace was used, and for those effected in larger crucibles, a 2,000 Hz induction furnace.

In all of the cases, the mass to be treated was brought to a temperature at which it was entirely molten. Gradual cooling followed, in the course of which a solid phase began to appear, of which the constitution could be determined from the phase diagram, when it was known. Under the effect of the electromagnetic field, the solid phase is collected in very compact form in a certain zone of the matrix.

EXAMPLE I

A mixture of 60 g of copper and 40 g of iron is melted in a crucible; the temperature is raised to 1540° C, temperature at which there is one single liquid phase. The heating is carried out by the induction winding, which creates Foucault currents within the sample. This winding also creates an alternating electromagnetic field of 10,000 Hz medium frequency. Subsequently, the melt is gradually cooled to 1094° C, by lowering the power fed to the terminals of the inductor. At this temperature solidification occurs which solidification commenced at approximately 1430° C.

The cooling program was as follows:

from 1540° to 1430° C: 20° C per minute
from 1430° to 1094° C: 2° C per minute.

Thus the sample is cooled to ambient temperatures at which a solid solution base is obtained based on iron surmounted by a block of copper, of which the compositions correspond to those given by the Cu-Fe phase diagram. The separation of the two phases is then very easy.

EXAMPLE II 800 g of an industrial alloy containing approximately 50% by weight of aluminum and 50% by weight of silicon is melted in a crucible and the temperature is raised to 1450° C, temperature at which there is one single liquid phase. The electromagnetic frequency used is then 10,000 Hz. As in the preceding, gradual cooling follows, which causes the precipitation of solid silicon.

This precipitation occurs in the temperature range from approximately 1060° to 577° C, according to the following cooling program:
from 1450° C to 1060° C: 20° C per minute
from 1060° C to 577° C: 4° C per minute.

During the entire second cooling period, the separation of the silicon occurs and a base of silicon containing very little aluminum, surmounted by a mass in the form of a very well defined bloom or lump of a eutectic Al-Si alloy, is collected at the end of the operation. The Al-Si alloy can then be easily separated, either by returning it to the liquid state, or by solidifying the entire mass and detaching this bloom in its entirety, which is very easy because the mechanical adherence of the bloom of eutectic on the silicon deposit is very slight.

If an analogous operation is used, using a high frequency (600 kHz) alternating electromagnetic field in place of the medium frequency (as above) magnetic field, an intimate mixture of silicon and eutectic Al-Si platelets is obtained, of which it is not easy to separate the two phases.

Moreover, if after proceeding according to the invention, the phosphorous content is determined (for example by a radio-chemical method), this element is concentrated in the silicon phase, and it attains, in the example considered, approximately 50 ppm, while the eutectic Al-Si phase does not contain more than a fraction of ppm up to a few ppm. This purification of the eutectic Al-Si phase is of interest when the effect of this element on the metallographic structure of the Al-Si eutectic is known.

Thus it is possible, according to the invention, to purify a eutectic Al-Si alloy of phosphorous by adding a little bit of silicon to it. Then the added silicon is easily recovered (which will contain a little bit of eutectic) for utilization in applications (for example, as an additive element for aluminum transformation alloys) in which the presence is not particularly troublesome.

Thus it is important to note, in general, that the process can also be used to refine metals. In particular, in solidifying an already essentially pure molten metal according to the process, it is possible to obtain a solid fraction purified of the impurities which have more affinity for the liquid than for the solid.

From another viewpoint, the process can also be carried out to realize enrichment of certain phases in minor elements.

EXAMPLE III

The object of the following example is to show that it is possible, to some extent, to experimentally determine the zone in which the solid phase will concentrate upon separation from the liquid matrix. Particularly, it is possible to determine this by the modification of the relative arrangements of centers of gravity of the crucible containing the sample and the induction winding which serves to heat the crucible contents.

For example, if melting a sample of 200 g of an industrial Al-Si alloy containing approximately 50% by weight of each element in a graphite crucible, and if the temperature is rising, and fusion and cooling is contemplated as indicated in Example I, it is possible to obtain a condition wherein the silicon ether is deposited on the base of the crucible or on the other hand is collected over the molten mass, to form a cap on the molten mass.

Particularly, the silicon collects on the base of the crucible when the centers of gravity of the induction winding and of the mass of the sample approximately coincide. On the other hand, if the crucible is slightly raised, so that the center of gravity of the mass to be treated is situated over the center of gravity of the inductor winding, it can be established that at the time of application of the magnetic field, the silicon is concentrated in a cap over the molten mass.

EXAMPLE IV

Approximately 250 g of a first electrolysis aluminum containing 0.36% iron and 0.12% silicon, is melted in a graphite crucible by action of a 10,000 Hz magnetic field. This aluminum, when cooled, can solidify in a temperature range of several degrees above or below 660° C.

Starting at 700° C (temperature at which the aluminum mass is entirely molten), the entire mass is cooled at a rate of approximately 1° C per minute.

The solidification begins at the bottom of the crucible and rises gradually. Thus approximately 75% of the batch is solidified, whereupon the operation is interrupted. A spectographic analysis of the ingot shows that the solidified part under the influence of the electromagnetic field does not contain more than 0.24% iron and 0.08% silicon, which is, for these two elements, a purification coefficient of 1.5.

We claim:
1. In a process of establishing separate phases in a mixture by cooling thereof from a relatively high temperature under which the mixture is maintained as a substantially homogenous melt, a method of accelerating said cooling to a lower temperature at which the separate phases coexist within a liquid matrix, comprising the steps of: generating an oscillating magnetic field; and applying said magnetic field to substantially the entire mass of the mixture during said cooling thereof until at least one of the separate phases is formed within a predetermined zone of the liquid matrix.

2. The method of claim 1, wherein said cooling is accelerated at a rate substantially higher than that producing the same concentration of said one of the phases within the predetermined zone of the liquid matrix in the absence of the magnetic field.

3. The method of claim 1, wherein said mixture includes an alloy containing a predetermined metal, said one of the phases being enriched with said predetermined metal.

4. The method of claim 1 wherein said one of the phases is enriched with impurities, whereby extraction of said one of the phases from the liquid matrix purifies another of the phases therein.

5. The method as defined in claim 1 wherein said accelerated cooling occurs at a rate of 4° C per minute.

6. A process as defined in claim 1, wherein the one of the separate phases which is separated from the matrix is a solid phase.

7. A process defined in claim 1, wherein the mixture consists of an alloy of copper and iron.

8. A process as defined in claim 1, wherein the mixture consists of an alloy of aluminum and silicon.

9. A process as defined in claim 1, wherein the mixture is constituted of an aluminum containing iron and silicon as essential impurities.

* * * * *